(12) United States Patent
Del-Toso (10) Patent No.: US 8,948,315 B2
(45) Date of Patent: Feb. 3, 2015

(54) RECEIVER COMPRISING A DEVICE FOR CORRECTING DOPPLER EFFECT

(75) Inventor: Christophe Del-Toso, Apprieu (FR)

(73) Assignee: STMicroelectronics International N.V., Amsterdam (NL)

( * ) Notice: Subject to any disclaimer, the term of this patent is extended or adjusted under 35 U.S.C. 154(b) by 813 days.

(21) Appl. No.: 13/125,112

(22) PCT Filed: Oct. 20, 2009

(86) PCT No.: PCT/EP2009/007511
§ 371 (c)(1),
(2), (4) Date: Aug. 22, 2011

(87) PCT Pub. No.: WO2010/046088
PCT Pub. Date: Apr. 29, 2010

(65) Prior Publication Data
US 2011/0299571 A1   Dec. 8, 2011

(30) Foreign Application Priority Data

Oct. 21, 2008  (FR) ..................... 08 05834

(51) Int. Cl.
*H04L 27/06* (2006.01)
*H04L 25/02* (2006.01)
*H04L 27/26* (2006.01)

(52) U.S. Cl.
CPC ........ *H04L 25/0232* (2013.01); *H04L 25/0212* (2013.01); *H04L 25/0242* (2013.01); *H04L 27/2647* (2013.01)
USPC ....................................... 375/340

(58) Field of Classification Search
CPC ....... G01S 15/60; G01S 15/58; G01S 15/586; G01S 15/582; H04L 25/0202; H04L 25/0222; H04L 27/2695; H04L 25/03006; H04B 7/18541
USPC ........ 375/316, 346, 348, 340; 367/87, 89, 90; 455/436–444
See application file for complete search history.

(56) References Cited

U.S. PATENT DOCUMENTS 5,913,168 A * 6/1999 Moreau et al. ................ 455/441
2005/0094738 A1  5/2005 Park
(Continued)

FOREIGN PATENT DOCUMENTS

EP   1089581 A1  4/2001
JP   11346380 A  12/1999
(Continued)

OTHER PUBLICATIONS

Hyuk Jun Oh et al: "An adaptive channel estimation scheme for DS-CDMA systems" Vehicular Technology Conference, 2000. IEEE VTS Fall VTC 2000. 52nd Sep. 24-28, 2000, Piscataway, NJ, USA,IEEE, vol. 6, Sep. 24, 2000, pp. 2839-2843, XP010525099 ISBN: 978-0-7803-6507-0.
(Continued)

*Primary Examiner* — Vineeta Panwalkar
(74) *Attorney, Agent, or Firm* — Gardere Wynne Sewell LLP (57) ABSTRACT

A OFDM digital communication receiver having channel estimate and correction means and inter carrier interference cancellation means based on the use of a temporal digital filter comprising a set of digital coefficients. The receiver includes n Look-Up Tables LUT(n), each corresponding to a given set of digital coefficients and an entry pointer.

33 Claims, 5 Drawing Sheets

(56) References Cited

U.S. PATENT DOCUMENTS

2006/0128326 A1* 6/2006 Pietraski ............... 455/130
2009/0258657 A1* 10/2009 Tanaka et al. ........... 455/456.1
2009/0318151 A1* 12/2009 Jung et al. ............. 455/436

FOREIGN PATENT DOCUMENTS

| | | |
|---|---|---|
| JP | 2008523721 A | 7/2008 |
| WO | 0028774 A1 | 5/2000 |
| WO | 2004023672 A2 | 3/2004 |
| WO | 2006062767 A2 | 6/2006 |
| WO | 2006137375 A1 | 12/2006 |
| WO | 2008075078 A1 | 6/2008 |
| WO | 2008084784 A1 | 7/2008 |

OTHER PUBLICATIONS

Patent Cooperation Treaty International Search Report and Written Opinion for PCT/EP2009/007511; Feb. 6, 2010; 9 pages.

* cited by examiner

RECEIVER COMPRISING A DEVICE FOR CORRECTING DOPPLER EFFECT

CROSS-REFERENCE TO RELATED APPLICATIONS

This application is a U.S. National Phase application submitted under 35 U.S.C. §371 of Patent Cooperation Treaty application serial no. PCT/EP2009/007511, filed Oct. 20, 2009, and entitled RECEIVER COMPRISING A DEVICE FOR CORRECTING DOPPLER EFFECT, which application claims priority to French patent application serial no. 0805834, filed Oct. 21, 2008, and entitled RECEPTEUR COMPORTANT UN DISPOSITIF DE CORRECTION DE L'EFFET DOPPLER.

Patent Cooperation Treaty application serial no. PCT/EP2009/007511, published as WO2010/046088, and French patent application serial no. 0805834, are incorporated herein by reference.

TECHNICAL FIELD

The present disclosure concerns the field of telecommunications and more specifically a multiple-carrier wireless digital communications receiver comprising a device for compensating for Doppler effect.

BACKGROUND

Multiple-carrier digital communications—which are also known as Orthogonal Frequency Division Multiplexing (OFDM) communications—show a great interest since the development of mobile communication, particularly with the most recent standards of: DVB-T (Digital Video Broadcasting—Terrestrial), WLAN (IEEE802.11n) (Wireless Local Area Network), Wimax (Worldwide Interoperability for Microwave Access), WiBro (Wireless Broadband), DVB-H (Digital Video Broadcasting—Handheld), T-DMB (Terrestrial Digital Multimedia Broadcasting). In a multiple-carrier digital transmission, a frequency band is divided in N multiple sub-channels, which corresponding to a sub-carrier receiving a band of frequency being equal to the bandwidth divided by the number of carriers. This results in carriers being assigned a small channel bandwidth, thus causing the communication to be sensitive to the Doppler effect which, as known in the art, is particularly present in case of a mobile receiver.

The Doppler effect is even more important in the absence of homogeneity within the different subcarriers because of the presence of multiple distinct paths for the different frequencies.

In order to compensate for Doppler effect, conventional multicarrier conventional receivers use processes and compensation devices which precisely take into account the presence of multiple and distinct communication paths for each subcarrier.

Such processing is based on the use of more or less sophisticated channel estimation and correction algorithms which are executed by means of a Digital Signal Processor (DSP) or by a specific processor integrated within the receiver and which is dedicated to such processing.

Without going through the details of different techniques known in the art for estimating and correcting channel, it suffices to recall that the estimation is generally based on the use of particular pilots or reference signals, assumed to be known from the receiver, which are periodically introduced inside the transmitted signal and which allows the estimation algorithm to evaluate, by means of successive interpolations, the characteristics of the channel for each particular subcarrier.

Generally speaking, it should be noticed that all those techniques known in the art have the drawback of requiring a non negligible processing resources from the existing DSP. Moreover, those algorithms for estimating and compensating the channel require calculations performed on a large set of data, thus requiring the use of a large amount of memory with the DSP processor.

It can thus be seen that the channel estimate algorithms implement complex and expensive electronic microcircuits.

Additionally, it is important to underline that these estimate techniques operate satisfactorily as long as the Doppler effect is limited in a low value, in the order of 10% of the inter-carrier space allocated to the sub-carrier, that means in practice that one hundred Hz correspond to an inter-carrier space in the order of 1 kHz.

Such limits are reached when the mobile receiver is moved at an increasing speed, in the order of one hundred kilometers per hour, what tends to be commonplace in the context of a contemporary mobile communication.

In order to take into account such particular situation wherein the mobile receiver is moved at a significant speed, the channel estimation and correction techniques which were mentioned above are to be combined with supplementary techniques in order to further take into account the increasing value of the Doppler effect and thus permit to cancel the interference between the carriers. Such techniques are conventionally designated under the name of Inter Carrier Interference (ICI) Cancellation or simply ICI Cancellation.

Clearly, the implementation of these supplementary techniques complicates the digital multi-carrier receiver architecture.

SUMMARY

An embodiment provides a simplified process and device to compensate the Doppler effect for a multi-frequency communication receiver, allowing complexity reduction in the receiver.

An embodiment provides a digital multi-carrier communication process and system achieving new functional features, among which the compensation of the Doppler effect.

An embodiment provides an improved hand-over control process, notably permitting the traffic management.

In an embodiment, compensation is achieved by means of a OFDM digital communication receiver which receives a signal transmitted through N carriers among a predetermined frequency bandwidth. The receiver comprises means for estimating the channel and means for cancelling inter-carrier interference (ICI) based on the use of digital filters involving the use of digital coefficients and operating in time domain and frequency domain.

In an embodiment, the time domain filtering which is executed in the channel estimation and correction block is simplified, notably by the simplification of the calculation of the updated set of coefficients. Conventional methods, designated as the gradient or double gradient methods, are known to consume a high level of processing resources. An embodiment of a method which is hereinafter proposed permits to significantly reduce complexity by performing an a priori calculation of the different sets of coefficients according to the mathematical model of Doppler spectrum, Doppler frequency (Fd) and signal to noise ratio (Signal-to-Noise Ratio, SNR).

Moreover, in an embodiment the receiver further includes:

storage means for storing n Look-Up Tables LUT(n), each corresponding to one given set of digital coefficients, each set of coefficients being a priori calculated as a function of the three parameters: the mathematical model of Doppler spectrum (e.g., Jakes model or Gaussian model), the Doppler frequency (Fd) and the signal to noise ratio (SNR). In an embodiment, the look-up-tables LUT(n) further comprise: an input pointer; means for reading each of said storage tables using as a pointer an information which is derived from the speed of the receiver with respect to a terrestrial reference and also from the signal to noise ratio; channel estimation means permitting the determination of the particular look-up table corresponding to an optimal model; and filtering means based on a digital filter using the set of coefficients selected by the above cited means.

Thus, by performing a reading operation of the look-up tables LUT(n), one may identify an appropriate set of coefficients which matches the correction of the Doppler effect which is appropriate in the filtering process.

In one embodiment, the OFDM communication system integrates a GPS type positioning receiver which provides information allowing a preliminary calculation of the speed in order to determine the value of the pointer to be used for accessing the look-up tables LUT(n). For example, the GPS receiver supplies an information (P, V, T), which is respectively representative of the position, the velocity and time.

Advantageously in one embodiment, the piece of information provided by the GPS receiver which is representative of the speed V is used to calculate the Doppler frequency (Fd). The latter is then combined with the signal to noise ratio (SNR) for pointing within the look-up tables LUT(n) to an appropriate set of coefficients to be used by the temporal filter serving for correcting the Doppler effect. An embodiment of this approach is presented in the diagram of FIG. 1C.

In a complementary manner, in one embodiment, the information P generated by the GPS receiver is used for controlling a hand-over procedure between two transmitters.

In an embodiment, the hand-over mechanism is controlled by a server communicating with the receiver and receiving from the latter information P generated by the GPS receiver.

An embodiment also achieves a process for controlling the switching of a OFDM digital receiver between two transmitters located in a close proximity, the process comprising the following steps:

generating an information P representing the position of the receiver containing the GPS sensor;

accessing a database identifying a list of transmitters situated in proximity of said OFDM receiver;

calculating the distances of the receiver with regard to said transmitters;

identifying the best receiver for a frequency switching; and controlling the switching of the receiver to the newly identified transmitter.

One embodiment achieves a process for controlling a hand-over mechanism in association with the use of an external server, which comprises the steps of:

generating an information P representing the receiver position comprising the GPS sensor; transmitting said information P towards an exterior server by communication means; determining by said server a list of transmitters and usable frequencies; transmitting to said OFDM receiver of the list of usable frequencies; and controlling the hand-over in accordance with the information received from the server.

In an embodiment, the server integrates a load control and Quality of Service (QoS) management tool for identifying and determining the list of transmitters to forward to the receiver.

In an embodiment, an OFDM digital communication receiver is configured to receive a signal transmitted on N carriers on a given frequency band. The receiver comprises channel estimate and correction means and inter carrier interference (ICI) cancellation means based on the use of a temporal digital filter comprising a set of digital coefficients. The receiver further comprises: storage means permitting the storage of n Look-Up Table LUT (n), each corresponding to a given set of digital coefficients; each set of coefficients being calculated a priori in function of three parameters: for example, the mathematical model of Doppler spectrum (Jakes model or Gaussian model), the Doppler (Fd) frequency and the signal to noise ratio (SNR). Each of said LUT(n) tables further comprises an entry pointer. The receiver comprises means for reading the Look-Up-Tables using as an entry pointer information derived from the speed of the receiver with respect to a terrestrial reference and, optionally to the signal to noise ratio. The receiver includes means for estimating the channel for the purpose of determining the particular Look-Up-Table corresponding to one optimal model. The receiver includes digital filtering means using the selected set of coefficients selected by said entry pointer.

In an embodiment, the entrance pointer receives a value representing the frequency shift of Doppler effect, calculated by starting from an information representing the speed generated by the GPS receiver.

In an embodiment, an OFDM digital communication receiver to receive signals transmitted on N carriers assigned to respective frequency bands comprises: means for storing n Look-Up Tables LUT(n), each table corresponding to a given set of determined digital coefficients, wherein the sets of coefficients are a function of: a mathematical model of Doppler spectrum; a Doppler frequency; and a signal to noise ratio, wherein each table comprises an entry pointer; means for selecting an entry pointer based on information related to a speed of the receiver with respect to a terrestrial reference frame; channel estimation means for selecting a set of coefficients from an table LUT(n) corresponding to the selected entry pointer; and means for filtering a digital signal based on the selected set of coefficients. In an embodiment, the channel estimation means is configured to select the set of coefficients based on at least one of a signal to noise ratio and a minimum error on a bit level. In an embodiment, the OFDM digital communication receiver further comprises a GPS positioning receiver configured to generate information V representing the speed of the receiver, wherein the means for selecting is configured to use the generated information V to select the entry pointer. In an embodiment, the GPS receiver further provides information representative of a position of the receiver and time. In an embodiment, the GPS receiver further provides information representative of a position of the receiver, and the OFDM receiver further comprising means for controlling hand-over between transmitters based on the position information provided by the GPS receiver. In an embodiment, the means for controlling hand over is configured to retrieve a list of frequencies from an external server based on at least one of the position information and the speed information V. In an embodiment, controlling handover between transmitters comprises: accessing a database identifying a list of transmitters located at proximity to the OFDM receiver; accessing information regarding respective distances of the receiver with respect to the transmitters; identifying a transmitter for a frequency switching; and controlling a switching of the receiver to the identified transmitter. In an embodiment, at least one of the transmitters is a base station, the database is maintained by the base station, the information regarding respective distances is generated by the base station and the identifying is performed by the base station. In an embodiment, the means for controlling handover is configured to retrieve a list of transmitters from an external server and the external server integrates traffic management tools and quality of service to generate the list of the transmitters. In an embodiment, the means for selecting is configured to select the entry pointer based on the information relating to the speed of the receiver and a signal to noise ratio. In an embodiment, the receiver is a mobile telephone.

In an embodiment, a method of controlling communications in a communications system having a receiver with at least one processor comprises: storing in the receiver a set of look-up tables of sets of digital coefficients, wherein the stored sets of digital coefficients are a function of a mathematical model of Doppler spectrum, a Doppler frequency and a signal to noise ratio; selecting, under control of the at least one processor, a set of coefficients from a table in the set of tables based on speed information; and filtering a digital signal based on the selected set of coefficients. In an embodiment, the selecting the set of coefficients comprises selecting a table entry pointer based on the speed information. In an embodiment, the selecting the set of coefficients is based on the speed information and at least one of a signal to noise ratio and a minimum error on a bit level. In an embodiment, the receiver comprises a GPS positioning receiver configured to generate the speed information. In an embodiment, the GPS positioning receiver further provides information representative of a position of the receiver and of time. In an embodiment, the system comprises a plurality of transmitters, the method further comprising controlling hand-over between the receiver and transmitters in the plurality of transmitters based on position information generated by the GPS receiver. In an embodiment, the controlling hand-over comprises: accessing a database identifying a list of transmitters located at proximity to the receiver; accessing information regarding respective distances of the receiver with respect to the transmitters; identifying a transmitter for a frequency switching; and controlling a switching of the receiver to the identified transmitter. In an embodiment, at least one of the transmitters is a base station, the database is maintained by the base station and the information regarding respective distances is generated by the base station. In an embodiment, the base station integrates traffic management tools and quality of service to generate a list of the transmitters and the identified transmitter is selected from the list. In an embodiment, the controlling handover comprises: transmitting the position information from the receiver to the at least one transmitter; generating, under control of the at least one server, a list of transmitters and exploitable frequencies; transmitting the list to the receiver; and controlling the hand-over based on the list.

In an embodiment, a communication device comprises: a global positioning block configured to generate speed information; a Doppler compensation controller configured to select a set of coefficients from stored sets of coefficients based on the generated speed information; and a channel estimation and control block configured to compensate for a Doppler effect based on the selected set of coefficients. In an embodiment, the Doppler compensation controller is configured to store the sets of coefficients in a set of tables of coefficients and to select a table entry pointer based on the speed information. In an embodiment, the Doppler compensation controller is configured to select the set of coefficients based on the speed information and at least one of a signal to noise ratio and a minimum error on a bit level. In an embodiment, the device further comprises a GPS positioning receiver configured to receive GPS information and to generate the speed information. In an embodiment, the GPS positioning receiver further provides information representative of a position of the device and of time. In an embodiment, the device further comprising a hand-over controller configured to control hand-over of the device between transmitters based on position information generated by the GPS positioning receiver. In an embodiment, the controlling hand-over comprises: accessing a database identifying a list of transmitters located at proximity to the receiver; accessing information regarding respective distances of the receiver with respect to the transmitters; identifying a transmitter for a frequency switching; and controlling a switching of the receiver to the identified transmitter. In an embodiment, at least one of the transmitters is a base station, the database is maintained by the base station and the information regarding respective distances is generated by the base station. In an embodiment, the base station is configured to integrate traffic management tools and quality of service to generate a list of the transmitters and the identified transmitter is selected from the list. In an embodiment, the hand-over controller is configured to: transmit the position information to at least one transmitter; receive a list of transmitters and exploitable frequencies from the at least one transmitter; and control hand-over based on the received list. In an embodiment, the device is a mobile telephone.

In an embodiment, a communication system comprises: at least one base station; a transceiver, including: a global positioning block configured to generate speed information; a Doppler compensation controller configured to select a set of coefficients from stored sets of coefficients based on the generated speed information; and a channel estimation and control block configured to compensate for a Doppler effect based on the selected set of coefficients. In an embodiment, the Doppler compensation controller is configured to store the sets of coefficients in a set of tables of coefficients and to select a table entry pointer based on the speed information. In an embodiment, the transceiver further comprises a GPS positioning receiver configured to receive GPS information and to generate the speed information. In an embodiment, the GPS positioning receiver is configured to generate position information and the at least one base station comprises a plurality of base stations, the transceiver further comprising a hand-over controller configured to control hand-over of the transceiver between base stations based on the position information generated by the GPS positioning receiver. In an embodiment, the controlling hand-over comprises: accessing a database identifying a list of base stations located at proximity to the receiver; accessing information regarding respective distances of the receiver with respect to the base stations; identifying a base station for a frequency switching; and controlling a switching of the transceiver to the identified base station. In an embodiment, a base station in the plurality of base stations is configured to integrate traffic management tools and quality of service to generate a list of the transmitters and the identified transmitter is selected from the list. In an embodiment, the system is configured as a mobile telephone network.

In an embodiment, a tangible computer-readable media's contents cause at least one processor in a communications system to perform a method of controlling communications, the method comprising: storing, in a receiver of the communication system, sets of digital coefficients, wherein the stored sets of digital coefficients are a function of a mathematical model of Doppler spectrum, a Doppler frequency and a signal to noise ratio; selecting, under control of the at least one processor, a set of coefficients from the stored sets of coefficients based on information related to a speed of the receiver; and compensating, under control of the at least one processor, for a Doppler effect based on the selected set of coefficients. In an embodiment, the selecting the set of coefficients comprises selecting a table entry pointer based on the speed information. In an embodiment, the receiver comprises a GPS positioning receiver configured to generate the speed information. In an embodiment, the GPS positioning receiver further provides information representative of a position of the receiver and of time. In an embodiment, the system comprises a plurality of transmitters, and the method further comprises controlling hand-over between the receiver and transmitters in the plurality of transmitters based on position information generated by the GPS positioning receiver. In an embodiment, the controlling hand-over comprises, under control of the at least one processor: accessing a database identifying a list of transmitters located at proximity to the receiver; accessing information regarding respective distances of the receiver with respect to the transmitters; identifying a transmitter for a frequency switching; and controlling a switching of the receiver to the identified transmitter. In an embodiment, the at least one processor comprises a processor in the receiver and a processor in one of the transmitters of the plurality of transmitters.

An embodiment achieves a new and particularly useful combination of the information supplied by a GPS receiver for the purpose of the control of critical functions of a OFDM receiver.

This disclosure is particularly adapted to the realization of a mobile phone comprising an OFDM receiver.

BRIEF DESCRIPTION OF THE DRAWINGS

Other characteristics, goals and advantages of embodiments will appear in the reading of the description and the drawings below, given hereafter as nonrestrictive examples. On the annexed drawings.

DETAILED DESCRIPTION

In the description that follows, various specific details are given for a better understanding of embodiments of the disclosure. The embodiments described may be implemented without one or several of these details, or by using other methods, equipment, materials, etc. In certain cases, materials or operations that are in and of themselves well known are not described in detail in order to not obfuscate certain aspects of the described embodiments. The reference to an "embodiment" in the descriptions signifies that a characteristic or a particular structure described in relation with this embodiment is included in this embodiment. Thus, the utilization of expressions "in one embodiment" or "according to one embodiment" in various parts of the description are not necessarily referring to the same embodiment. Moreover, the particular characteristics relative to each embodiment may be combined in an appropriate manner to form one or more other embodiments.

The process described below is applicable to any multicarrier wireless communication. The digital terrestrial television system DVB-T (Digital Video Broadcasting—Terrestrial), the mobile television system DVB-H (Digital Video Broadcasting-Handheld), and communication according to the 4G, the WIFI and WIMAX standards are cited as examples in a non restrictive manner.

After reviewing the specification, one skilled in the art will be able to adapt the principles described hereafter to other digital communication systems in OFDM multiple frequencies.

Figure 1A:
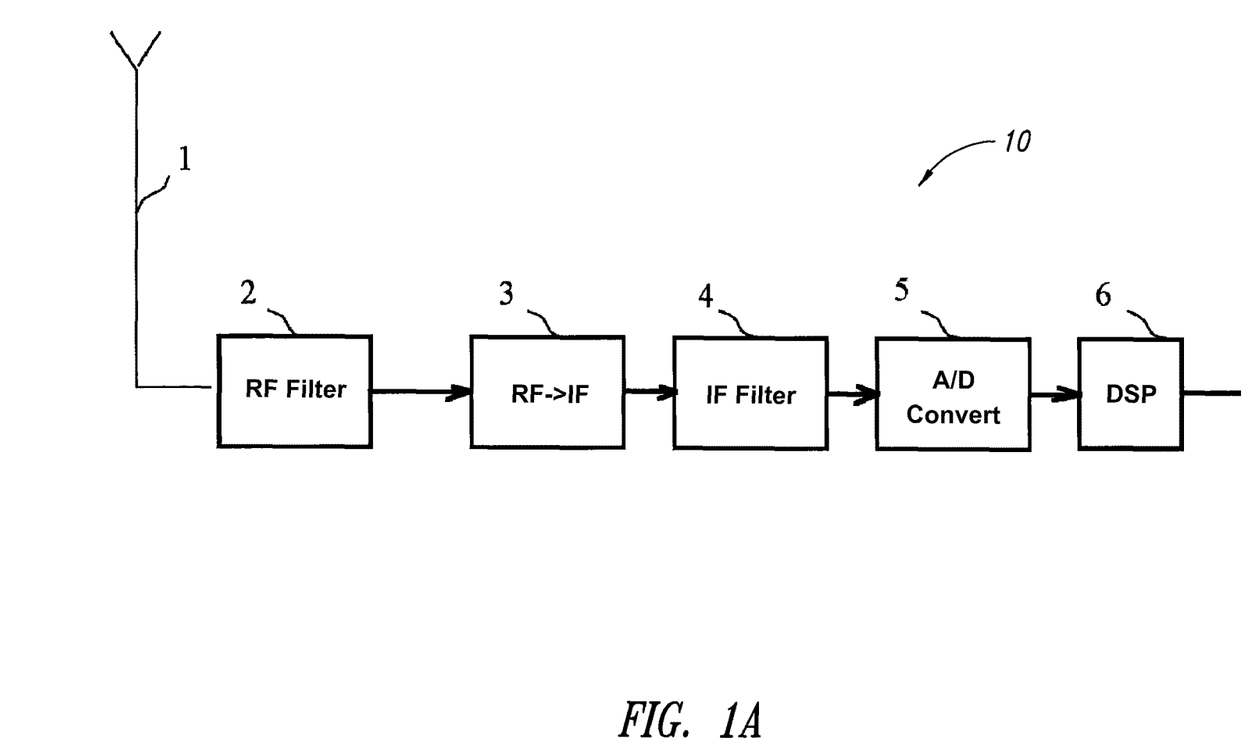
FIG. 1A illustrates the architecture of an embodiment of an OFDM receiver.

FIG. 1A illustrates the sequence of blocks achieving the processing of the signal in one embodiment of an OFDM receiver 10 based on a digital architecture. There is comprised an antenna 1 connected to a Front-end circuit 2 providing conventional RF treatment, that is to say the channel selection as well as the cancellation of interference and adequate amplification. A block 3 carries out the conversion of RF signal into an intermediate frequency (IF) which is then filtered by a block 4 before being introduced into an analog to digital converter 5 for the purpose of generating digital samples representative of the IF signal, which can thus be processed by a digital signal processor (DSP) 6.

The digital signal processor (DSP) 6 achieves the appropriate digital processing of the digitized samples and particularly performs a digital filtering executed in the channel estimation and correction block for the purpose of compensating for the Doppler effect. Multiple compensation algorithms can be used. Known compensation algorithms, which are not described in detail herein, may be used in some embodiments.

Conventionally, the compensation of the Doppler effect is, as recalled above, associated with a mechanism of channel estimate and correction which is particularly complex to carry out.

According to one embodiment, one can greatly simplify the channel estimation and correction algorithm by using a double time domain/frequency domain filtering. In one embodiment, the time domain filter particularly comprises sets of coefficients which are no longer adaptive, on a real-time mode, but stored into a look-up table which one can access by means of a input pointer V which is representative of the speed of the receiver and, optionally, the signal to noise ratio of the communication into the channel.

This very simple mechanism—and yet effective—can be combined with one or more filtering algorithms in the frequency domain and which achieves inter-carrier interference cancellation (ICI cancellation). After reviewing the specification, one skilled in the art can apply embodiments to a particular context. One will simply recall that, contrary to the known processes, it is not longer necessary to resort to a complex mechanism such as the method of the gradient or the double gradient in order to determine, in an adaptive way, the set of coefficients adequate to be used for temporal filtering.

In an embodiment, the sets of coefficients to be used are simply "read" and not "calculated", as conventionally.

Thus, one substitutes the complex algorithms of the regular coefficients update, with a simple mechanism of Look-Up Table reading for the determination of the coefficients of digital filtering for the Doppler effect correction.

According to one embodiment, the receiver comprises a table of coefficients which can be addressed via a pointer comprising one information V provided by an external element with regard to the receiver, which could be, for example a telecommunications operator or a service provider.

According to an embodiment, the information V is directly generated by a GPS (Global Positioning System) type positioning receiver permitting to provide information (PVT) relative to the positioning of the receiver (P), at its speed (V), as well as a temporal information (T).

Thus the GPS receiver provides the variable V.

Alternatively an estimate mechanism of signal to noise ratio based on the pilots provides the value of the signal to noise ratio (SNR) which is combined with the variable V.

In an embodiment, the two variables are combined and the combination is used as an input pointer for accessing the Look-Up table for the purpose of determining the digital filtering coefficients to be used to compensate for the Doppler effect.

In a mode of implementation, the signal to noise ratio (SNR) is calculated by means of the use of pilots or reference signals.

Figure 1B:
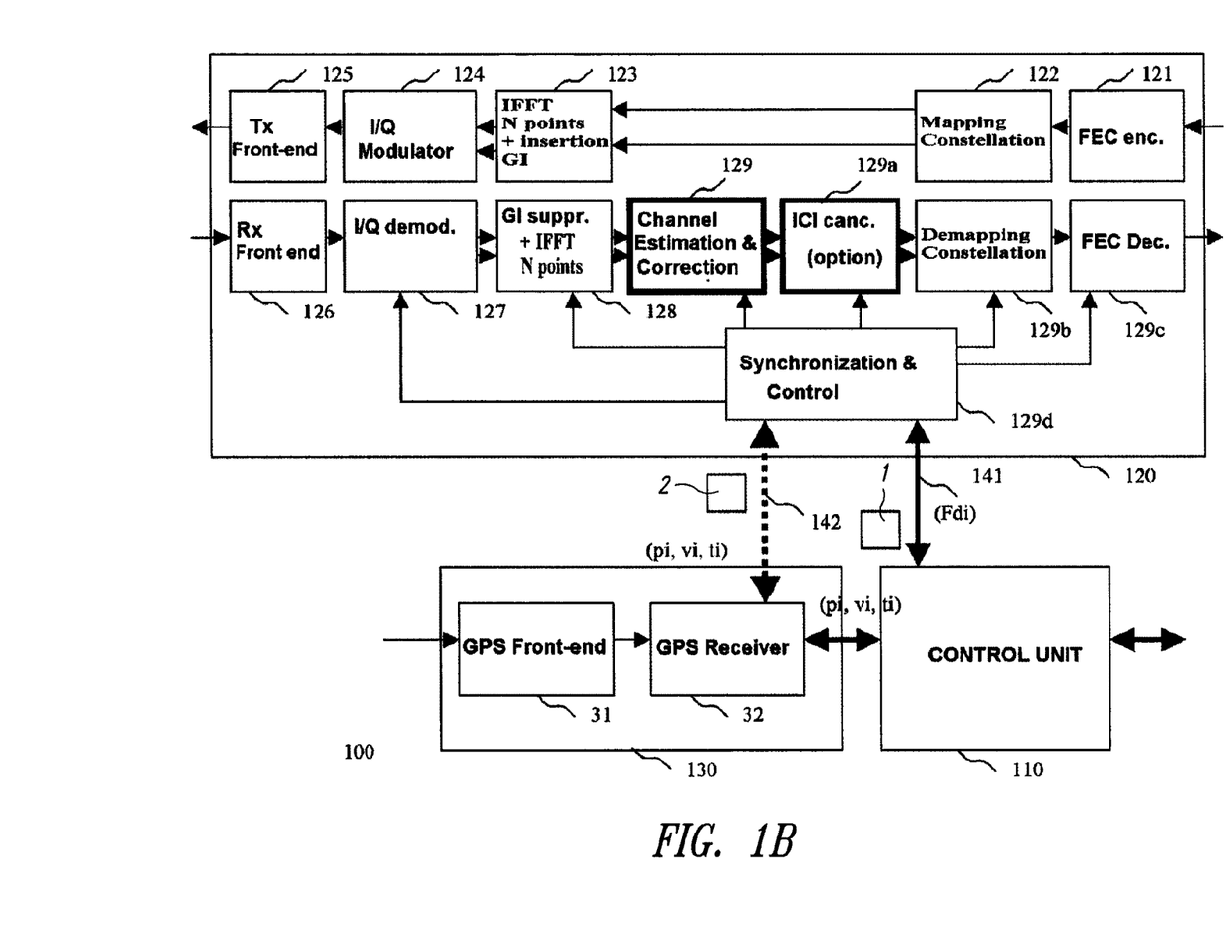
FIG. 1B illustrates the general scheme of one embodiment of an OFDM digital communication receiver which comprising a digital filtering for cancelling Doppler effect on the basis of information representative of the speed.
Figure 1C:
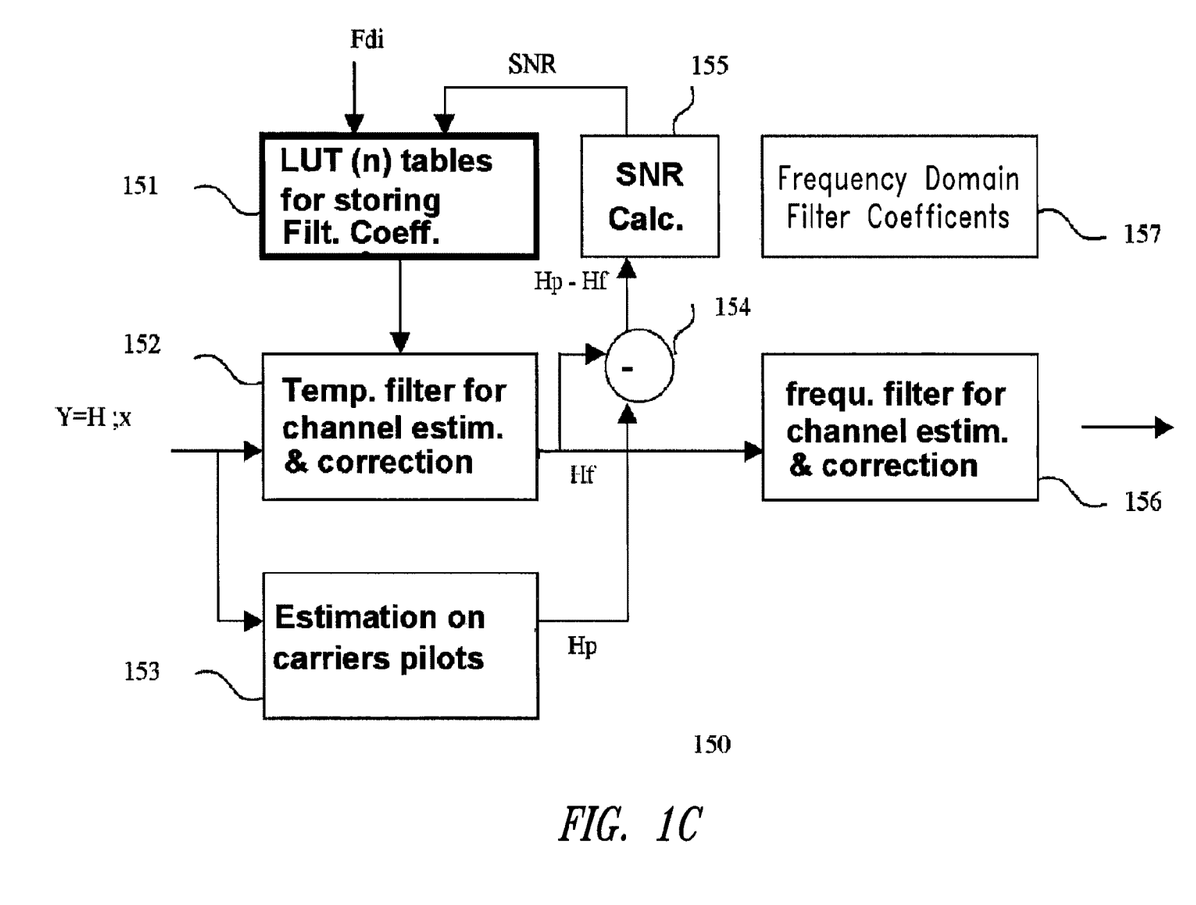
FIG. 1C illustrates an embodiment in which the signal to noise ratio (SNR) is computed from the use of pilots or reference signals.

FIG. 1C represents an embodiment of this mode of implementation.

As it is seen, this very simple LUT read mechanism of the coefficients makes it possible to replace complex channel estimate algorithms for the different subcarriers. This results in a reduction of the complexity of the receiver and, thus, its manufacturing costs.

Furthermore, it has been observed that the integration of a GPS type positioning receiver within a wireless communication receiver, may provide advantageous new functionalities.

In one embodiment, the GPS positioning receiver provides the three variables (P, V, T) which respectively represent the position P of the receiver with respect to a terrestrial reference frame, to the speed of the same receiver and to an information representative of the time.

The information relative to the speed is used, as mentioned above, to calculate the pointer for reading the look-up tables and for determining the coefficients to be used in the digital filtering achieving Doppler effect correction.

FIG. 1B illustrates an embodiment allowing integration, within an OFDM receiver, of the information $(p_i, v_i, t_i)$ periodically generated by a GPS receiver.

The OFDM digital receiver 100 comprises a general control 110, a GPS type positioning unit 130 and a digital transmitter-receiver 120.

The digital transmitter-receiver 120 comprises a transmission chain Tx and a chain of reception Rx.

The transmission chain comprises, in series, an FEC encoder 121, a "mapping" constellation block 122, a IFFT arithmetic block to N complex items 123 which as illustrated incorporates a mechanism of Guard Interval (GI) (such mechanism corresponding to a certain number of temporal samples which are added in the heading of the OFDM symbol), an IQ modulator 124 allowing to modulate the temporal signal in Phase (I=In-Phase) and in Squaring (Q), a frontal Tx 125 comprising a digital to analog converter, of a radio frequency transmitter.

The chain of reception comprises a front end receiver Rx 126, a demodulator IQ 127 allowing the demodulation in Phase (I=In-phase) and Squaring (Q) of the real signal, an arithmetic unit 128 for transforming complex Fourrier FFT to N elements, which incorporates a mechanism for suppressing the Guard Interval (GI), an estimate and correction block of channel 129, an optional block of interference cancellation between carriers (ICI cancellation) 129a, a constellation demapping block 129b, followed by a FEC decoder 129c.

In addition, the time and frequential synchronization of the OFDM receiver is carried out by the synchronization and control block 129d.

In a dual way, OFDM Rx FE block 126 groups, as one can see in FIG. 1B, the conventional digital functions of the RF reception circuit, the tuner, and the analog-to-digital (A/D) converter. The samples of the signal provided by the block 126 are then demodulated in phase and in quadrature by the block 127 which consequently generates a succession of complex temporal samples (I and Q). These samples are grouped in a complex vector of N points in order to be presented to the FFT transformation block of Fourrier 128 so as to generate a complex vector corresponding to a decomposition of the subcarrier spectrum by the subcarrier (BIN).

The IQ demodulation methods for implementing the processing executed by block 128 are well-known to a person skilled in the art and will not be further detailed.

The vectors are then processed by block 129 allowing channel estimation and correction and also by the optional block 129a carrying out the inter-carrier interference cancellation. Blocks 129 and 129a generate a succession of complex samples which are provided to the constellation de-mapping block 129b which provides for each complex point a continuation of M-bits where M is the degree of constellation and $2^M$ its number of states. The bits at the exit of block 129b are treated by the FEC decoder 129c implementing in particular the techniques of error correction (Forward Error Correction Code) based on an adapted coding, such as for example the VITERBI decoding combined with the REED SOLOMON decoding.

System 100 comprises in addition to the control unit 110, a GPS type positioning receiver 130, this last comprising as illustrated on the one hand the front end analog GPS FE circuits 31 as well as receiver 32.

This receiver 32 periodically generates samples $(p_i, v_i, t_i)$ which are respectively representative of the position, the speed and the time.

In a first embodiment represented by "square 1" on the FIG. 1B, these samples $(p_i, v_i, t_i)$ are transmitted to the control unit 110 which is configured to compute the instantaneous value of the speed starting from information emanating from the GPS, in particular the vector $(x_i, y_i, z_i)$ identifying the position of the receiver at the moment according to the formula:

$$\|v_i\|^2 = \left(\frac{(x_i - x_{i-1})^2 + (y_i - y_{i-1})^2 + (z_i - z_{i-1})^2}{t_i^2}\right)$$

Once the speed is known, the command unit 110 is thus able to calculate the $Fd_i$ Doppler frequency according to the formula:

$$Fd_i = \|v_i\| * Fc/c$$

where Fc is the frequency of the considered carrier, and c is the speed of light. In general, this Fc frequency is known to the control unit 110. One will recall, for example that for the mobile television systems comprising a frequency band of 474 MHz to 852 MHz, an initialization phase is planned to scan the frequencies and to identify the Fc operation frequency.

Then, $Fd_i$ information is transmitted to receiver 120, for example via the synchronization and command block 129d as that is represented by reference 141, in order to assist the algorithms of channel estimate and correction.

Different techniques of channel estimation can use this information $Fd_i$ derived from the speed of the receiver. For the sake of conciseness, one will not recall the detail of the conventional channel estimation techniques which are well known to a skilled person. It will be simply pointed out that, in general, one very classical method being used for estimating and correcting the channel consists in a double filtering, both in time domain and in frequency domain. The complexity of the algorithms lies in the calculation of the coefficients of the temporal and frequential filters.

Various algorithms can be considered, such as for example a Wiener filtering, zero-forcing algorithms, the maximum of probability . . . ), each one obviously depending on the Fdi Doppler frequency shift.

In an embodiment, the diagram of FIG. 1C describes an embodiment of the channel estimate and correction block 129.

In this embodiment, the coefficients of the temporal filter 152 are a priori calculated for various values of $Fd_i$ Doppler shift and SNR and then are stored in LUT(n) tables 151. The LUT(n) tables are read by means of a pointer calculated by starting from the value of the $Fd_i$ Doppler frequency provided by the GPS receiver and from the signal to noise ratio (SNR) calculated from blocks 153, 154 and 155. Block 153 calculates an estimate of the H channel response n the pilot carriers, hereinafter denoted Hp. Block 154 carries out the subtraction between the temporal response of the filtered channel and the estimated channel calculated on the pilots.

This difference is used as an entry pointer with block 155 carrying out the calculation of signal to noise ratio (SNR) which is used as entry with the LUT(n) tables 151 just like the Doppler frequency $Fd_i$.

The samples filtered by block 152 are then provided to the frequential filtering block 156 which uses the frequency domain filter coefficients provided by block 157.

Generally speaking, one can consider various models of channels corresponding to various considered situations. Each model may be defined by a mathematical formula which, this also, depends on the $Fd_i$ Doppler frequency shift.

The calculation of the time domain filter coefficients may be obtained by the following calculation matrix:

$$C = R^{-1} \cdot r$$

where $R^{-1}$ is the reverse of the autocorrelation time-frequency matrix, i.e., $R=E(Yn,k, Y^*n,k-m)$ where Y is the disturbed observation and r is the autocorrelation vector in frequency domain $r=E(Xn, Y^*n,k-m)$ where X is the value searched and Y the disturbed observation.

The autocorrelation matrix depends on three parameters:
the mathematical model of the Doppler spectrum (i.e., Jakes model or Gaussian model);
the $Fd_i$ Doppler frequency; and
the signal to noise ratio in the channel noted as SNR.

While varying the values of these three parameters, there is given the possibility to perform an a priori calculation of the values of the filter coefficients and tabulate these values in LUT(n) tables.

In one embodiment, it is possible to a priori determine the mathematical model of the Doppler spectrum. For example, in the case of an application such as mobile television, the model of channel called COST 207 TU6 is very well approximated by Jakes mathematical model. In this particular embodiment, one will calculate the coefficients of the temporal filter by using the Jakes model. In fact, the value of the coefficients will depend on two parameters: the value of the $Fd_i$ Doppler frequency and the value of the signal to noise ratio SNR.

In an embodiment for which the operation of the system is for a certain value of SNR, SNR parameter could also be fixed a-priori, that leads to a reading of the tables LUT(n) on the basis of a single input pointer which is only representative of the speed.

Consequently, one can see that it becomes possible, thanks to information $Fd_i$ derived from information received from the GPS and, when appropriate, from the SNR, to calculate in a simplified manner the filtering coefficients allowing the estimate of the channel and the cancellation of ICI.

For this purpose, for each model (n) of the considered channel, there is arranged a reading table LUT (n) (look-up table) within block 129 comprising a set of coefficients and an entry pointer corresponding to information $Fd_i$ and to SNR. Thus, the combination value of $Fd_i$ will be able to return the set of coefficients appropriate to the speed of the corresponding receiver for the model of the Doppler spectrum selected.

To carry out the choice between the various "models"— and consequently the choice between different LUT(n) tables, one may fix a-priori the mathematical model of the Doppler spectrum according to the application or to the use of known techniques, particularly based on a criterion of signal-to-noise ratio (Carrier to Noise Ratio C/N) or on the criterion of the minimum error on the bit level (Block Error Rate).

According to a second example embodiment (represented by option "2" on FIG. 1B), the samples ($p_i$, $v_i$, $t_i$) which are generated by the receiver 32 are presented, as one sees, with reference 142, in the synchronization and control unit 129d communicating with each block of the reception chain. The information provided by the GPS can be introduced in the algorithms of channel estimation embodied by block 129.

According to another embodiment, one may consider a standardized interface between the GPS receiver and the control unit 110 or even between transmitter-receiver 120 so as to facilitate the use of information produced by the first and its integration within the second. For example, an embodiment of an interface might comprise:

CLK_PVT [1 bit]: clock signal generated by the receiver and accessible on the standardized interface;

DATA [3+N bits]: parallel data port, defining the available type of data (x, y, z, t);

DATA_VALID [1 bit]: signal generated by the GPS receiver towards the OFDM interface of the modem. When equal to "1", it indicates that a x,y,z,v data is valid and can be read by the unit 110 or the OFDM receiver, DATA_VALID: should remain in a high state until the reception by the GPS receiver of signal DATA_ACK generated by the control unit 110 or the OFDM modem; and DATA_ACK: signal generated by the command unit 110 or the OFDM modem. When equal to "1", it indicates that data was suitably extracted from the command unit 110 or from the OFDM modem. The GPS receiver can then switch the validation signal DATA_VALID.

According to another embodiment, one results in a significant improvement of the switch procedure (hand-over in the Anglo-Saxon literature) which governs the passage of a digital receiver of a first transmitter to a second transmitter.

As it is known, the hand-over procedure is conventionally achieved according to various criteria, as for example the measurement of the power of the received signal which is particularly fast to obtain, or the measurement of the signal-to-noise ratio which requires a longer and more complex treatment.

To implement these procedures for the management of the "hand-over" is, as one can see, expensive in computing power and especially in electrical energy since one cannot completely "extinguish" the transmitters out of the emission period. A considerable part of nonuseful time is then used to "listen" or "scan" the various channels in order to take the necessary measurements for the management of the hand-over procedure between several transmitters.

In an embodiment, this additional problem may be addressed by means of a simple and elegant solution using information P provided by the GPS positioning receiver to identify and determine the most convenient transmitters to use.

Figure 2:
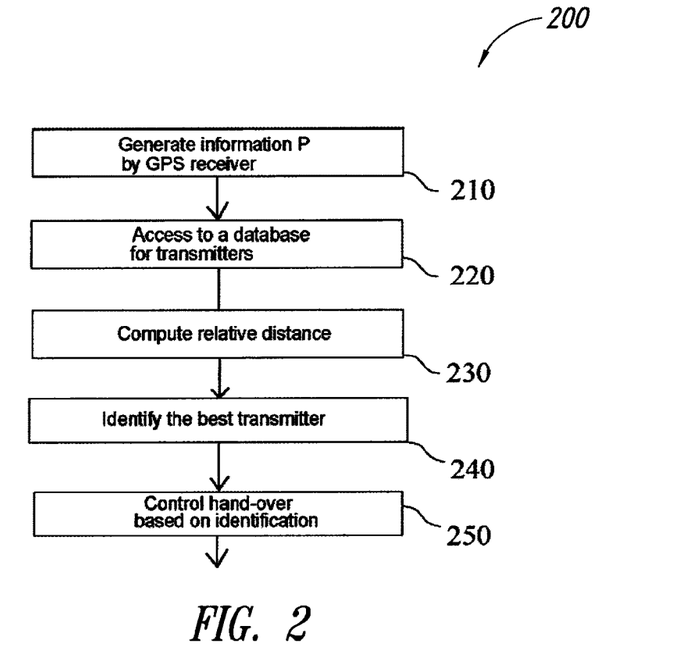
FIG. 2 represents a flow-chart of a hand-over procedure of one wireless digital receiver from one transmitter to another, based on an information P supplied by a GPS type positioning receiver.

FIG. 2 illustrates an embodiment of a process 200 of hand-over management starting from information P provided by the GPS receiver. The process 200 is described by reference to the embodiment of a system 100 of FIG. 1B. Embodiments other than the one shown in FIG. 1B may employ the embodiment of process 200 shown in FIG. 2.

The process starts by step 210 corresponding to the—periodical—generation of information P by the GPS receiver contained in the digital communication receiver.

In step 220, candidate transmitters are determined. For example, the control unit 110 may access a database comprising a list of potential transmitters, candidates to proceed further again with the communication.

In step 230, distance is calculated. For example, the control unit 110 carries out a calculation of distances on the basis of information P generated by the GPS receiver to determine the relative distances from the receiver, compared to the various transmitters.

Then, in step 240, the control unit identifies, on the basis of the distance calculation, a candidate for proceeding further the communication during the hand-over.

In step 250, the control unit causes the switching of the receiver on the characteristics of the new transmitter identified during step 240.

As seen, the switching procedure does not require the implementation of long (and expensive in energy) periods of scanning and analyzing the various channels to determine the best transmitter to use.

Figure 3:
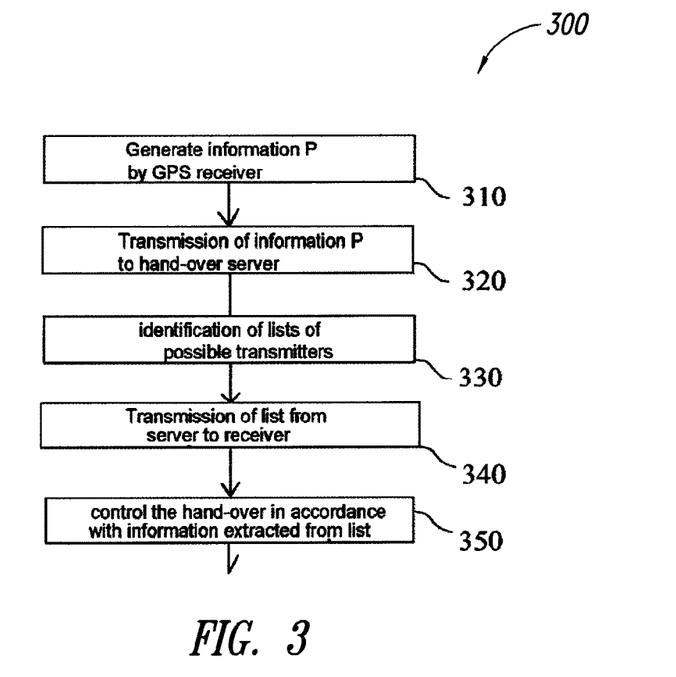
FIG. 3 illustrates a second embodiment of a hand-over process of a receiver based on an external server.

FIG. 3 illustrates an embodiment of a method 300 in which the identification of the transmitter includes an external server communicating with the receiver for the implementation of the hand-over procedure.

The process starts by step 310 corresponding to the—periodical—generation of information P by the GPS receiver contained in the digital communication receiver.

In step 320, this information is transmitted to an external server via conventional means of communication.

In step 330, the aforementioned server uses information P to determine and identify a list of transmitters and operation frequencies likely to be used by the digital receiver.

This list of transmitters and operation frequencies is transmitted in step 340 to the digital receiver via, for example, the same channel transmission as that used during step 320, so as to be received within the control unit.

In one embodiment, the digital receiver uses the elements of the received list to establish communication on a new frequency and, consequently, on the new transmitter.

In another embodiment, the server provides a list of transmitters and frequencies, in function not only to the proximity of the receiver compared to said transmitters, but also according to a policy of Quality of Service (QoS) and load management.

Thus, in this manner one will be able to allow the relief of a transmitter particularly loaded because of the presence of a great number of receivers in its immediate proximity. A slightly more distant transmitter could then be used as a relay under the hand-over command of the server which will be able to decide, according to the requests, the attribution of the resources to the various users.

As seen, the above described procedure presents many advantages and will be able to allow multiple methods of load management, from the simplest one to the more complex ones.

Moreover, owing to the fact that it is not anymore necessary to "scan" several frequency bands out of the "useful" activation period, this also saves power within the digital receiver.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology.

Figure 4:
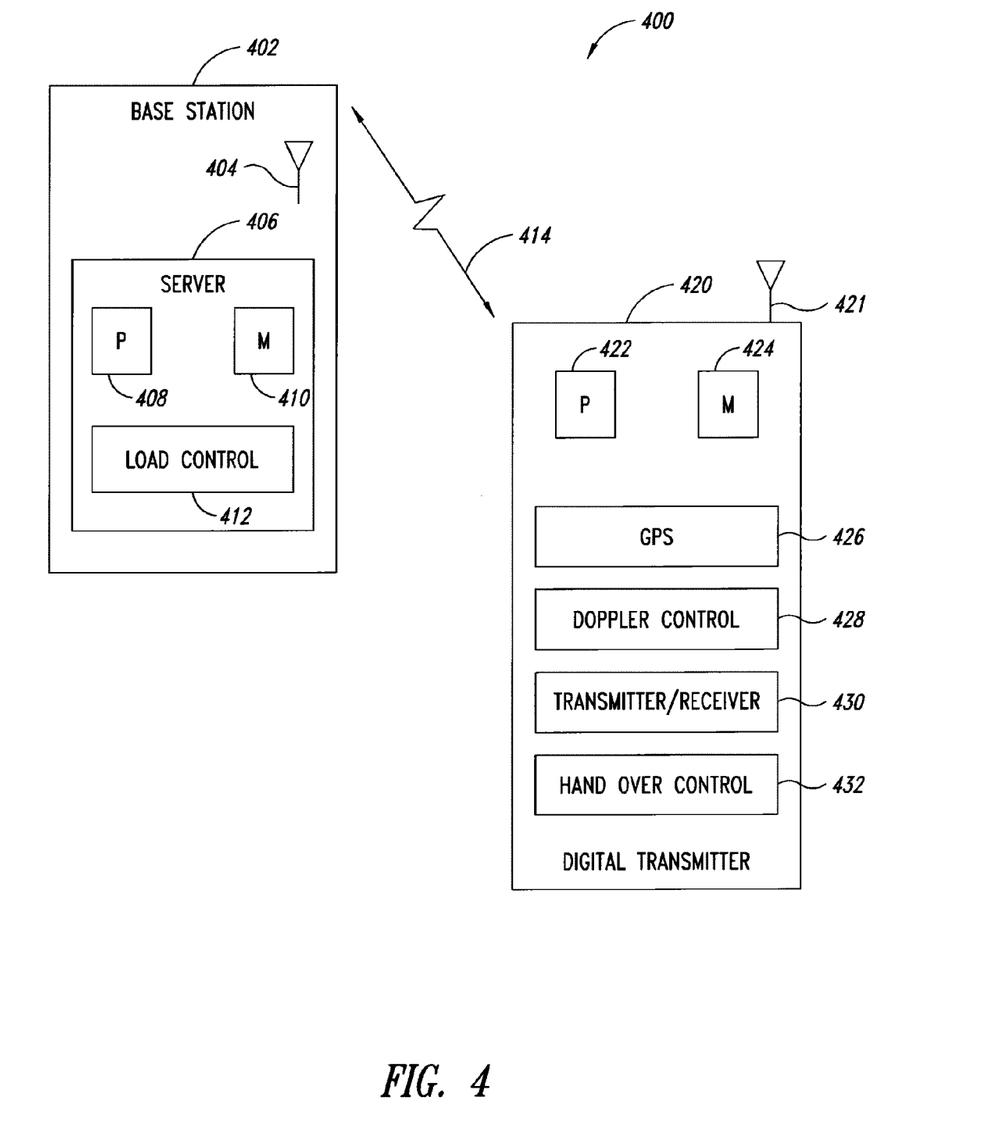
FIG. 4 illustrates a functional block diagram of an embodiment of system comprising an OFDM digital communication transceiver and a base station.

For example, FIG. 4 illustrates an embodiment of a communication system 400 comprising one or more base stations 402 and one or more digital transceivers 420. The base station(s) and the digital transceiver(s) are configured to communicate using one or more communication channels of one or more communication links 414, which as illustrated are radio frequency communication links. The base station 402 may comprise, for example, a cellular telephone system base station or repeater station. The transceiver 420 may comprise, for example, a cellular device such as a cellular phone. For ease of illustration, only one base station 402, one transceiver 420 and one communication link 414 are shown in FIG. 4. The functions of the various modules may be combined in some embodiments. For example, the Doppler control 428 may be integrated into the transmitter/receiver 430 in some embodiments.

The base station 402 comprises an antenna 404 and a server 406. The server includes at least one processor 408 and at least one memory 410. The server as illustrated also includes a load control module 412 configured to manage load control, which may include, for example, managing hand-over as discussed above with regard to method 200 of FIG. 2 or method 300 of FIG. 3. The load control module 412 may be implemented, for example, by discrete circuitry, by firmware, by the processor 408 of the server 406 executing instructions stored in the memory 410, by data structures stored in the memory 410, or by various combinations thereof.

The transceiver 420 comprises an antenna 421, at least one processor 422 and at least one memory 424. The transceiver also includes a GPS block 426 configured to generate GPS information, a Doppler control block 428 configured to compensate for Doppler effects, for example by using one of the methods discussed above, a transmitter/receiver 430, and a handover control block 432. The handover control block 4323 may be configured to control handover in accordance with, for example, the embodiments of method 200 of FIG. 2 or method 300 of FIG. 3. The GPS 426, the Doppler control block 428, the transmitter/receiver 430, and the handover control block 432 may be implemented, for example, by discrete circuitry, by firmware, by the processor 422 executing instructions stored in the memory 424, by data structures stored in the memory 410 or in the memory 410, or by various combinations thereof.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An Orthogonal Frequency Division Multiplexing (OFDM) digital communication receiver to receive signals transmitted on N carriers assigned to respective frequency bands, where N is a positive integer, the receiver comprising:
 a memory for storing n Look-Up Tables LUT(n) where n is a positive integer, each table corresponding to a given set of determined digital coefficients, wherein the sets of coefficients are a function of:
  a mathematical model of Doppler spectrum;
  a Doppler frequency; and
  a signal to noise ratio, wherein each table comprises an entry pointer;
 a channel estimation block configured to receive periodic position (P), velocity (V) and temporal (T) (PVT) information related to the receiver with respect to a terrestrial reference frame; wherein the PVT information is used by the channel estimation block to derive an instantaneous velocity of the receiver and a Doppler frequency associated with a selected carrier of the N carriers;
 the channel estimation block is further configured to point to one of the entry pointers of the LUT(n) and select a set of coefficients based on the Doppler frequency associated with the selected carrier; and
 a filter block configured to filter a digital signal from the selected carrier based on the selected set of coefficients.

2. The OFDM digital communication receiver according to claim 1 wherein the channel estimation block is further configured to point to one of the entry pointers based on the Doppler frequency associated with the selected carrier and at least one of the signal to noise ratio and a minimum error on a bit level.

3. The OFDM digital communication receiver according to claim 1, further comprising a Global Positioning System (GPS) receiver configured to generate the PVT information and provide the PVT information to the channel estimation block.

4. The OFDM digital communication receiver according to claim 3, further comprising means for controlling handover between transmitters based on the periodic position information P provided by the GPS receiver.

5. The OFDM digital communication receiver according to claim 4 wherein the means for controlling hand over is configured to retrieve a list of frequencies from an external server based both the periodic position information P and the velocity information V.

6. The OFDM digital communication receiver of claim 4 wherein the means for controlling handover between transmitters is configured to:
 access a database identifying a list of transmitters located at proximity to the OFDM receiver;
 access information regarding respective distances of the receiver with respect to the transmitters;
 identify a transmitter for a frequency switching; and
 control a switching of the receiver to the identified transmitter.

7. The OFDM digital communication receiver of claim 6 wherein at least one of the transmitters is a base station, the database is maintained by the base station, the information regarding respective distances is generated by the base station and the identifying is performed by the base station.

8. The OFDM digital communication receiver of claim 4 wherein the means for controlling handover is configured to retrieve a list of transmitters from an external server and the external server integrates traffic management tools and quality of service to generate the list of the transmitters.

9. The OFDM digital communication receiver of claim 1 wherein the channel estimation block is further configured to select the entry pointer based on the information relating to the Doppler frequency corresponding to a Doppler spectrum selected and the signal to noise ratio.

10. The OFDM digital communications receiver of claim 1 wherein the receiver is a mobile telephone.

11. A method of controlling communications in a communications system having a receiver with at least one processor, the method comprising:
 storing in the receiver a set of look-up tables of sets of digital coefficients, wherein the stored sets of digital coefficients are a function of a mathematical model of Doppler spectrum, a Doppler frequency and a signal to noise ratio;
 calculating, under the control of the at least one processor, an instantaneous velocity of the receiver from periodic position P, velocity V and temporal T information about the receiver provided from a Global Positioning System (GPS) block;
 calculating, under the control of the at least one processor, a Doppler frequency associated with a considered carrier and for the instantaneous velocity;
 selecting, under control of the at least one processor, a set of coefficients from a table in the set of tables based on the calculated Doppler frequency; and
 filtering a digital signal based on the selected set of coefficients from the considered carrier frequency.

12. The method of claim 11 wherein the selecting the set of coefficients comprises selecting a table entry pointer based on the calculated Doppler frequency.

13. The method of claim 11 wherein the selecting the set of coefficients is based on the calculated Doppler frequency and at least one of the signal to noise ratio and a minimum error on a bit level.

14. The method of claim 11 wherein the communications system comprises a plurality of transmitters, the method further comprising controlling handover between the receiver and transmitters in the plurality of transmitters based on position P information generated by the GPS receiver.

15. The method of claim 14 wherein the controlling handover comprises:
   accessing a database identifying a list of transmitters located at proximity to the receiver;
   accessing information regarding respective distances of the receiver with respect to the transmitters;
   identifying a transmitter for a frequency switching; and
   controlling a switching of the receiver to the identified transmitter.

16. The method of claim 15 wherein at least one of the transmitters is a base station, the database is maintained by the base station and the information regarding respective distances is generated by the base station.

17. The method of claim 16 wherein the base station integrates traffic management tools and quality of service to generate a list of the transmitters and the identified transmitter is selected from the list.

18. The method of claim 14 wherein the controlling handover comprises:
   transmitting the position information from the receiver to at least one transmitter of the plurality of transmitters;
   generating, under control of the at least one server, a list of transmitters and exploitable frequencies;
   transmitting the list to the receiver; and
   controlling the hand-over based on the list.

19. A communication device comprising:
   a global positioning block configured to generate position P, velocity V and temporal T information;
   a control block configured to calculate an instantaneous velocity and a Doppler frequency associated with a considered carrier frequency from the P, V and T information;
   a Doppler compensation controller configured to select a set of coefficients from stored sets of coefficients based on the Doppler frequency; and
   a channel estimation and control block configured to compensate for a Doppler effect on the considered carrier frequency based on the selected set of coefficients.

20. The device of claim 19 wherein the Doppler compensation controller is configured to store the sets of coefficients in a set of tables of coefficients and to select a table entry pointer based on the Doppler frequency.

21. The device of claim 19 wherein the Doppler compensation controller is configured to select the set of coefficients based on the Doppler frequency and at least one of a signal to noise ratio and a minimum error on a bit level.

22. The device of claim 19, further comprising a handover controller configured to control handover of the device between transmitters based on position information generated by the global positioning block.

23. The device of claim 22 wherein the controller is adapted to:
   access a database identifying a list of transmitters located at proximity to the receiver;
   access information regarding respective distances of the receiver with respect to the transmitters;
   identify a transmitter for a frequency switching; and
   control a switching of the receiver to the identified transmitter.

24. The device of claim 23 wherein at least one of the transmitters is a base station, the database is maintained by the base station and the information regarding respective distances is generated by the base station.

25. The device of claim 24 wherein the base station is configured to integrate traffic management tools and quality of service to generate a list of the transmitters and the identified transmitter is selected from the list.

26. The device of claim 22 wherein the handover controller is configured to:
   transmit the position information to at least one transmitter;
   receive a list of transmitters and exploitable frequencies from the at least one transmitter; and
   control hand-over based on the received list.

27. The device of claim 19 wherein the device is a mobile telephone.

28. A non-transitory computer-readable media whose contents cause at least one processor in a communications system to perform a method of controlling communications, the method comprising:
   storing, in a receiver of the communication system, sets of digital coefficients, wherein the stored sets of digital coefficients are a function of a mathematical model of Doppler spectrum, a Doppler frequency and a signal to noise ratio;
   selecting, under control of the at least one processor, a set of coefficients from the stored sets of coefficients based on a calculated Doppler frequency for a considered carrier frequency based on an instantaneous velocity derived from periodic position P, velocity V, and temporal information related to the receiver; and
   compensating, under control of the at least one processor, for a Doppler effect based on the selected set of coefficients.

29. The computer-readable media of claim 28 wherein the selecting the set of coefficients comprises selecting a table entry pointer based on the Doppler frequency of the considered carrier frequency.

30. The computer-readable media of claim 28 wherein the receiver comprises a Global Positioning System (GPS) positioning receiver configured to generate the position P, velocity V and temporal T information.

31. The computer-readable media of claim 30 wherein the system comprises a plurality of transmitters, the method further comprising controlling handover between the receiver and transmitters in the plurality of transmitters based on position information generated by the GPS positioning receiver.

32. The computer-readable media of claim method of claim 31 wherein the controlling handover comprises, under control of the at least one processor:
   accessing a database identifying a list of transmitters located at proximity to the receiver;
   accessing information regarding respective distances of the receiver with respect to the transmitters;
   identifying a transmitter for a frequency switching; and
   controlling a switching of the receiver to the identified transmitter.

33. The computer-readable media of claim 32 wherein the at least one processor comprises a processor in the receiver and a processor in one of the transmitters of the plurality of transmitters.

* * * * *